United States Patent [19]

Williams, Jr.

[11] Patent Number: 4,868,866

[45] Date of Patent: Sep. 19, 1989

[54] BROADCAST DATA DISTRIBUTION SYSTEM

[75] Inventor: Billy L. Williams, Jr., Sea Bright, N.J.

[73] Assignee: McGraw-Hill Inc., New York, N.Y.

[21] Appl. No.: 161,267

[22] Filed: Feb. 18, 1988

Related U.S. Application Data

[63] Continuation of Ser. No. 687,479, Dec. 28, 1984, abandoned.

[51] Int. Cl.⁴ .............................................. H04K 9/00
[52] U.S. Cl. ................................. 380/49; 340/825.26; 364/408; 358/86; 455/6
[58] Field of Search ........ 364/200, 900, 403, 406–408; 340/825.26

[56] References Cited

U.S. PATENT DOCUMENTS

| | | | |
|---|---|---|---|
| 4,264,925 | 4/1981 | Freeman et al. | 358/86 |
| 4,292,650 | 9/1981 | Hendrickson | 358/122 |
| 4,323,921 | 4/1982 | Guillou | 358/114 |
| 4,337,483 | 6/1982 | Guillou | 380/20 |
| 4,346,442 | 8/1982 | Musmanno | 364/408 |
| 4,354,201 | 10/1982 | Sechet et al. | 358/114 |
| 4,376,978 | 3/1983 | Musmanno | 364/408 |
| 4,450,477 | 5/1984 | Lovett | 455/5 |
| 4,451,701 | 5/1984 | Bendig | 358/85 |
| 4,486,853 | 12/1984 | Parsons | 364/408 X |
| 4,491,983 | 1/1985 | Pinnow et al. | 358/86 |
| 4,536,791 | 8/1985 | Campbell et al. | 358/114 |
| 4,591,983 | 5/1986 | Bennett et al. | 364/403 |
| 4,597,046 | 6/1986 | Musmanno etal. | 364/408 |
| 4,598,367 | 7/1986 | DeFrancesco et al. | 364/408 |
| 4,600,921 | 7/1986 | Thomas | 380/20 X |
| 4,677,434 | 6/1987 | Fascenda | 380/23 |
| 4,677,552 | 6/1987 | Sibley, Jr. | 364/408 |
| 4,694,397 | 9/1987 | Grant et al. | 364/408 |
| 4,700,297 | 10/1987 | Hagel, Sr. et al. | 364/408 |
| 4,714,995 | 12/1987 | Materna et al. | 364/200 |

FOREIGN PATENT DOCUMENTS

| | | | |
|---|---|---|---|
| 1489571 | 10/1977 | United Kingdom | 364/408 |
| 1489572 | 10/1977 | United Kingdom | 364/408 |
| 1489574 | 10/1977 | United Kingdom | 364/408 |
| 1504112 | 3/1978 | United Kingdom | 364/407 |

OTHER PUBLICATIONS

Dubey et al., "Data Comm. Network for Air–India and Indian Airline"; *Journal of the Instn Elect. and Telecom. Engrs.*; (vol. 24, No. 3-4; 3-4/78; pp. 172–176).

Otsuki et al., "New Data Comm. System for Nationwide Banking Activities"; *Japan Telecomm. Rev.*; (vol. 22, No. 1; 1/80; pp. 62–66).

*Primary Examiner*—Stephen C. Buczinski
*Assistant Examiner*—Bernarr Earl Gregory
*Attorney, Agent, or Firm*—Darby & Darby

[57] ABSTRACT

A broadcast data distribution system collects, edits, verifies, formats and distributes real-time (dynamic) and non-real-time (static) data.

A central database is maintained and updated continuously. Data in the central database is continuously broadcast to an unlimited number of subscribers, each having receiving apparatus and a local database. In normal data traffic situations, real-time data messages are broadcast as they are received. In heavier data volume situations, newly received data messages are compared with last-known values for the particular data record being updated. If the change is determined to be significant, the update message is broadcast; otherwise, it is not. In extremely heavy data traffic volume situations, real-time data messages are not broadcast.

The invention ensures that the subscribers' local databases are current, even when real-time data messages are not being generated, or are only being generated for data records whose values have changed significantly.

Static (non-real-time) data messages are interleaved with real-time data messages to provide subscribers with a variety of different types of information.

Subscriber access to broadcast data messages may be controlled by broadcast entitlement messages or message headers which enable or disable a particular subscriber's receiving apparatus. Once messages are properly received, the subscriber's local database is updated with the data contained in those broadcast messages.

15 Claims, 9 Drawing Sheets

BROADCAST DATA DISTRIBUTION SYSTEM

This is continuation, of application Ser. No. 687,479, filed Dec. 28, 1984, now abandoned.

DISCLOSURE OF THE INVENTION

This invention relates to a method and apparatus for acquiring, editing, verifying, formatting and distributing data from multiple data sources, In particular, the invention is directed to an information distribution system for providing both real-time data and periodic (non-real-time) data to an unlimited number of subscribers each having receiving apparatus via a one-way, non-interactive broadcast data feed.

Currently available architecture for data distribution systems may take several forms. The first of these can be described as a acknowledge/negative-acknowledge (Ack/Nack) system, where data is distributed from a central database and the subscriber then verifies the data and acknowledges or negatively acknowledges its receipt back to the central database system. While this traditional form of data distribution provides extremely high reliability of the data received by the subscriber, it is also expensive and cumbersome, since each subscriber must be provided with a method of returning its Ack/Nack message (most typically by a two-way telephonic link), the data must be transmitted individually to each subscriber who has a need for the data, and the central system computer must have resources proportional to the number of active subscribers.

Another form of a currently available data distribution system provides a complete data picture to each subscriber on a periodic or "Loop" basis. This "Loop" architecture overcomes the limitation described in the Ack/Nack system in that data is uniformly broadcast to an unlimited set of subscribers. In the "Loop" architecture, central site resources are not a function of the number of subscribers. However, a major limitation of this system is the amount of data that can be delivered since each new data element added to the database introduces an additional "Loop" delay (i.e. the time required for all data to be distributed once). The "Loop" delay is directly proportional to the size of the database. Therefore, these systems can distribute only a limited amount of data and still maintain real-time status.

A third architecture for electronic data distribution is simple broadcast of transaction/free-wheeling data, i.e., data transmitted in one direction from a source to a receiving station which does not depend on the receiving station's readiness to receive the data. The most well-known examples of this method of data distribution are news wire services and stock exchange tickers. These data distribution systems also provide for the uniform broadcast of data to an unlimited number of subscribers. They suffer, however, from a serious reliability problem in that data is sent only once. Therefore, if any data is lost by a subscriber, it cannot be recovered. Without some mechanism for recovery of missed or lost data, these systems have very limited applications in a comprehensive distributed data processing or data display environment.

The financial industry provides an illustrative example of an industry requiring vast amounts of data in order to successfully engage in trading in the many financial markets which exist worldwide. Just in the case of North Amercian exchanges, more than thirty distinct data streams each different, covering tens of thousands of issues generate more than seventy update transactions per second. Dozens of issues are added daily, and dozens more are deleted; at varying monthly intervals, hundreds of options expire and hundreds of others are created. With respect to other issues such as dividends, earnings, and capitalization, descriptive material is modified daily. Additionally, each of the exchanges limits access to their data to their authorized receivers. Due to exchange regulations and exchange fees each subscriber system is permitted to access only the set of exchanges it chooses and for which it is authorized. Prior to this invention, maintenance and control of these databases has required their location at a central site or at a very limited number of distributed sites requiring two-way communications.

It is therefore an object of this invention to provide a data distribution system which can provide a broad range of data through a one-way broadcast medium to an unlimited number of subscribers at the lowest possible delivery cost.

It is another object of this invention to provide a data distribution system that can provide highly reliable data suitable for comprehensive distributed data processing without the requirement of acknowlegement of receipt by the subscriber.

It is yet a further object of this invention to provide a broadcast data distribution system that eliminates the necessity of continually rebroadcasting the entire database.

It is still another object of this invention to provide a broadcast data distribution system which can transmit both real-time and non-real-time data either of which can be formatted or unformatted.

It is yet another object of this invention to provide a comprehensive means of controlling access to the broadcast data by the receiving systems without the requirement for two-way communications.

The above and other objects of the present invention are realized in a specific illustrative embodiment relating to the financial industry. In the system of the present invention, financial data having multiple input protocols is collected from securities exchanges worldwide and decoded, and the central database is updated. Depending on the current volume of data traffic, the incoming data may simultaneously be reformatted for broadcast and then transmitted on a broadcast data bus. Periodic summaries, called recaps, of recently received data are broadcast to ensure accuracy of all current information at the subscriber's location. Queue processing techniques are employed to provide continuous summaries when the volume of data traffic precludes broadcast of individual data messages. Particular data messages which must be accurately received by all subscribers are distributed by controlled transmissions and repeated a predetermined number of times sufficient to ensure high reliability of reception. Data is broadcast over existing common carriers, including satellite, leased line, voice-grade line and others.

Subscriber access is controlled by transmitted "entitlement" messages which enable the receiving means of authorized subscribers to receive and process the broadcast data. Entitlement messages are used to provide limited users with selected portions of data while providing full broadcast service to others, over the same broadcast data feed. Each subscriber has means for receiving, maintaining and processing a local data base tailored to its specific requirements. The local database is being constantly updated by data broadcast transmissions. User requests, in the event of broadcast failure, are serviced via backup transmission modes.

The foregoing and additional features and advantages of the instant invention will become more readily apparent from the following detailed description of a specific illustrative embodiment of particular features thereof, presented hereinbelow in conjunction with the accompanying drawings, in which.

Figure 1:
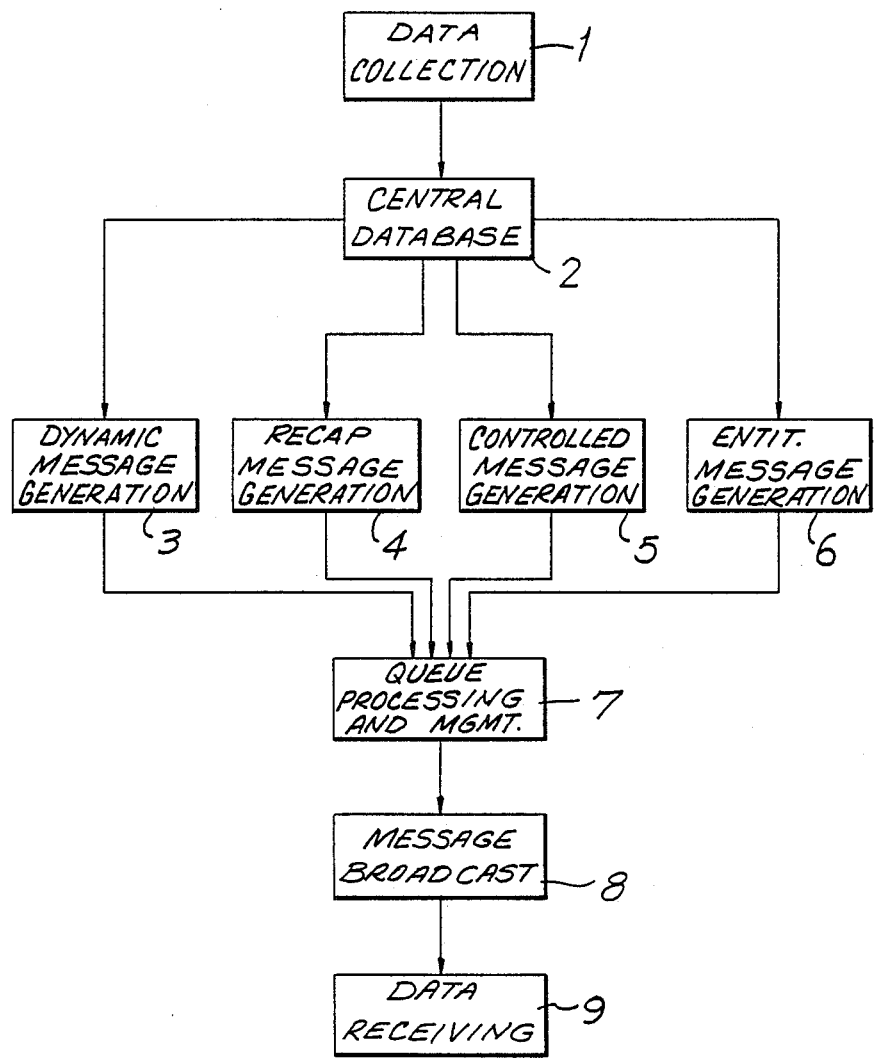
FIG. 1 is a block diagram depicting the principal functional blocks in accordance with the principles of the present invention for an improved broadcast data distribution system.

Referring now to FIG. 1, there is shown in overall scope a data processing and system organizational block diagram for implementing an improved broadcast data distribution system incorporating the principles of the present invention. After briefly describing each of the major functional blocks of FIG. 1, the data processing function and structure of each functional block will be described in detail.

At the beginning of the data distribution chain is the data collection block 1. In this illustrative embodiment relating to the financial industry, data enters the system in a number of ways, including communication lines from financial exchanges, online operator terminals, external online real-time systems, offline data entry terminals, and offline data entry systems. Depending upon the particular data source, the data may have to be edited, verified and/or converted into a machine readable format compatible with whatever internal specifications the system designer chooses.

Once data verification methods have determined and ensured the accuracy of collected data, the data is stored in central database files containing, for example, real-time financial pricing information. The database update functional block 2 represents the accurate updating and maintenance of a large number of different database files, each designed for different types of data.

Each of the next four blocks (dynamic message generation 3, recep message generation 4, controlled message generation 5, and entitlement message generation 6) describe portions of the system which are continuously operating to format received data from the central database so that it may be further transmitted to subscribers.

The messages produced by each of the the four message generation functional blocks 3, 4, 5, 6 are next queued for broadcast in queue management block 7. Data processing in this block prioritizes the messages to be broadcast. In addition, queue monitoring functions are employed to determine the actual rate of traffic flow into the data collection block 1 to the overall system. This traffic flow rate is used to control the several modes of operation of the dynamic message generation block 3 and the recap message generation block 4.

From the queue management block 7, data messages are passed to the data broadcast block 8 where they are transmitted via any of a number of broadcast media to an unlimited number of subscribers.

Finally, the data messages are received by structure and associated data processing of the data receiving functional block 9. This portion of the system receives all of the data which a particular subscriber is entitled to receive, decodes the messages if necessary, alerts the subscriber when data to which he is entitled has not been properly received, and stores the data in the subscriber's local database. Not included within the definition of the broadcast data distribution system is the subscriber-specific hardware/software which the subscriber uses to access and manipulate the local database. Such apparatus is within the state of the art, and may be provided in the form, for example only, of a programmed "personal" computer.

These foregoing functional blocks will now be described in detail.

Figure 2:
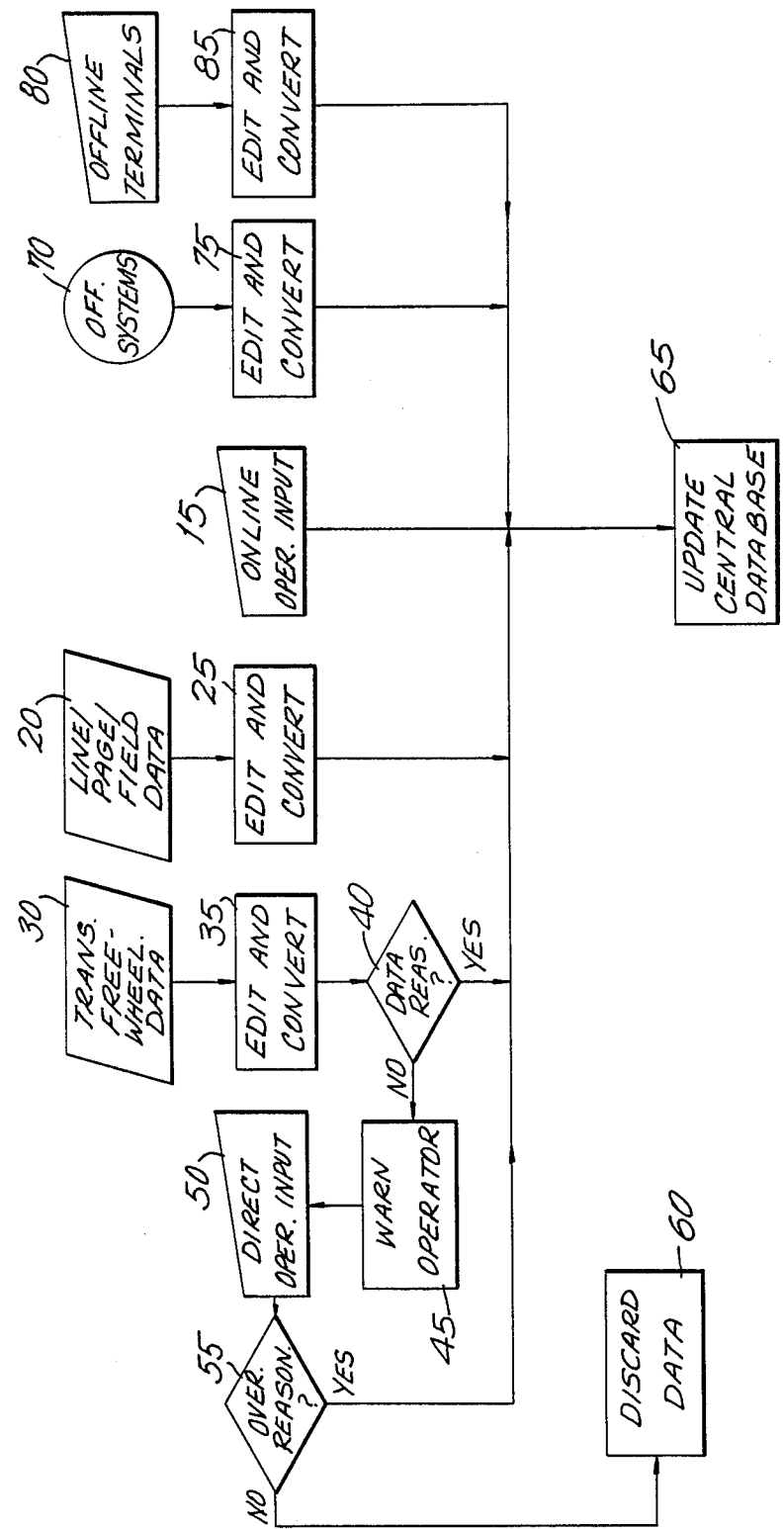
FIG. 2 is a schematic flow chart depicting detailed data processing for the data collection block 1 and the central database block 2 of FIG. 1.

Referring now to FIG. 2, the various elements of the data collection functional block 1 are shown, as required in this specific illustrative embodiment relating to the financial industry. Transaction/free-wheeling data 30 includes real-time pricing and administrative information concerning current trading and trading-related activities. This free-wheeling data is received via communications lines from the floors of the various stock option, bond and commodity exchanges. Data is transmitted from the exchanges in one direction only, from the exchange to the free-wheeling data receiver 30, and the data transmission occurs regardless of the preparedness of data receiver 30 to receive such data.

Free-wheeling data may be in asynchronous or synchronous format, and is transmitted using a variety of baud rates, record formats and parity checking specifications. This specific embodiment of the present invention handles many hundreds of different transaction types and formats. Illustrative of the possible variations between input protocols are Chart 1, Ticker Line Specifications, and Chart 1A, Commodity Line Specifications, shown below. Of course, the present broadcast data distribution system receives data from many more sources than the eight input sources shown on the two charts. Each of the ticker lines provides a set of messages having unique formatting requirements, thus making up a total of more than 600 different formats in the present system. Of course, the number of unique input formats will depend upon the specific application of the present invention.

CHART 1 - TICKER LINE SPECIFICATIONS

| TICKER [1] | CTS | NASD-Q | NYB-T | TSE |
| --- | --- | --- | --- | --- |
| BROADCAST | yes | yes | yes | yes |
| BAUD RATE | 9600 | 2400 | 134.5 | 4800 |
| SYNC/ASYNC | S | S | A | A |
| BITS/CHAR | 8 | 8 | 9 | 9 |

-continued

| TICKER [1] | CTS | NASD-Q | NYB-T | TSE |
|---|---|---|---|---|
| START BITS | 0 | 0 | 1 | 1 |
| DATA BITS | 7 | 7 | 6 | 7 |
| PARITY BITS | odd | odd | none | even |
| STOP BITS | 0 | 0 | 2 | 1 |
| LRC | yes-1 | yes-2 | no | yes-3 |
| BLOCKING | yes | no | no | yes |
| SEQ # | yes | no | no | yes |
| RETRANSMIT | yes | yes | no | yes |
| FIXED/VAR | F | V | V | F |
| CHAR CODE | ASCII | ASCII | ticker | ASCII |

[1] CTS is the Consolidated Tape System maintained by Securities Industry Automation Corp., providing data on all U.S. stocks.
NASD-Q is the quote line from the National Ass'n of Securities Dealers.
NYB-T is the trade line for New York Stock Exchange bonds.
TSE is the Toronto Stock Exchange.

CHART 1A - COMMODITY LINE SPECIFICATIONS

| COMMODITY [2] | CBT | NYFE | KCBT | MACE |
|---|---|---|---|---|
| BROADCAST | yes | yes | yes | yes |
| BAUD RATE | 2400 | 2400 | 1200 | 1200 |
| SYNC/ASYNC | A | S | A | A |
| BITS/CHAR | 10 | 8 | 9 | 11 |
| START BITS | 1 | 9 | 1 | 1 |
| DATA BITS | 7 | 7 | 6 | 7 |
| PARITY BITS | even | odd | none | always 1 |
| STOP BITS | 1 | 0 | 2 | 2 |
| LRC | none | yes | none | none |
| BLOCKING | no | yes | none | none |
| SEQ # | yes | yes | none | yes |
| RETRANSMIT | yes | yes | none | yes |
| FIXED/VAR | F | F | V | F |
| CHAR CODE | ASCII | ASCII | ticker | ASCII |

[2] CBT is the Chicago Board of Trade.
NYFE is the New York Futures Exchange.
KCBT is the Kansas City Board of Trade.
MACE is the Mid-America Commodity Exchange.

For the sake of clarity, the terms in the left column of Charts 1 and 1A will be briefly defined, although the meaning of each of the terms is known to those of ordinary skill in the art:

BROADCAST - In this context, broadcast indicates that the data feed from the exchange is a one-way communication of data.

BAUD RATE - The unit of signalling speed. It is the number of signal elements sent and received per second. Since a signal element can represent more than one bit, baud rate is not the same as bits per second.

SYNC/ASYNC - This indicates whether the data feed is synchronous (the communication line is synchronized to a common clock) or asynchronous (no block is used).

BITS/CHAR - The number of bits used to represent a character of data.

START BITS - The number of bits preceeding a unit of data.

DATA BITS - The number of bits in each unit of data.

PARITY BITS - Parity count is the number of ones present in a binary sequence. A parity bit is used to ensure that the count is either even or odd depending on the parity. No parity indicates that the parity bit is not used.

STOP BITS - The number of bits following a unit of data.

LRC - Longitudinal Redundancy Check - a well-known method of error detection. A number following "yes" indicates a specific variant of LRC.

BLOCKING - Indicates whether messages are sent as blocks.

Generally, synchronous communication is blocked and asynchronous communication is unblocked.

SEQ #- Indicates whether each message has a sequence number associated with it. If a sequence number is supplied, errors can be more easily identified and corrected.

RETRANSMIT - Describes whether the data feed has a rebroadcast capability to facilitate recovery of missed information.

FIXED/VAR - Describes whether the data feed has fixed size or variable size fields within data records.

CHAR CODE - Indicates the character set that is used for information transfer.

In order to work with the incoming free-wheeling data, the data is edited and converted (block 35) into a set of only a few dozen different transaction types. Illustrations of these transaction types are listed below in Chart 2, Transaction Types -- Free-wheeling Data. It will be readily apparent to those skilled in the art that other sets of messages could be proposed to handle each particular larger set of messages to which the inventive principles and concepts of the present invention might then be applied.

CHART 2

TRANSACTION TYPES -- FREE-WHEELING DATA (DYNAMIC MESSAGES)

| MESSAGE TYPE | REPORTED FOR |
|---|---|
| Trade | Equity, Debt, Option, Future, Futures Option |
| Quote | Equity, Debt, Currency, Option, Future, Futures Option, Physical |
| News Alert | Equity |
| Value | External Index, Internal Index |
| Range | Future, Futures Option |
| Commodity Recap | Future, Futures Option, Physical |
| Cumulative Volume & Opening Interest | Equity, Future, Futures Option, Physical |
| Statistics | Statistics |
| Rankings | Rankings |
| Open/Close | External Control, Internal Control |
| Time | Internal Control |
| Equity Recap | Equity, Debt, External Index, Option, Internal Index |
| Spread | Future, Futures Option |
| Settlement & Limits | Future, Futures Option |

Edited transaction data are then tested for reasonability (block 40), most routinely comprising a comparison with the last known value of the particular data, computing the percentage change between the new and the old value, and accepting the new value if the computed percentage change is less than an empirically predetermined number which is deemed to define reasonable limits of change absent unusual circumstances. A number of different data processing techniques for testing the reasonability of different types of data are well known in the art. In this specific illustrative embodiment, different appropriate techniques are employed depending on the specific nature of the incoming data.

If the data passes the validity and reasonableness checks (YES output from 40), it is sent via an internal data bus 42 to the database update functional block 65 of the broadcast data distribution system. If the data fails the reasonability check 40 (NO output from 40), a system operator warning (block 45) is issued. From a direct operator input terminal 50, a system operator can then review the rejected transaction data. If the operator determines that the rejection is not valid, he may issue an instruction from terminal 50 to override the reasonability rejection. If the system receives the operator's override instruction 50 (YES output from 55), the data is sent on internal data bus 42 to be stored in the central database. If the override message is not received (NO output from 55), the data is discarded (block 60).

Data may also be entered into the system through online operator terminals 15. Through these terminals, system operators may modify or correct any data field or record in the real-time central database.

External online real-time systems provide data in a free-format structure. This page/line/field data 20 includes news, ranking information, group statistics, and any other data which is field or line-oriented as observed on a display screen. Common spreadsheet information is typical of field data. News headline services exemplify line-oriented data. Page/line/field data is validated, edited and converted (block 25) for internal storage and is placed on the internal data bus 42.

Still another source of data collection is offline or non-real-time data entry terminals 80, used to enter new additions, deletions or other modifications to the central database. This mode of data entry is generally accomplished by batch processing, with operators creating update material in temporary files. The temporary files are then processed for updating the central database, for example, at the end of each day. Dividend changes and other fundamental data or corporate action field changes such as CUSIP number, description, and additional markets are updated in this manner. As with other data entry modes, this data is edited and converted (block 85) for internal system use and is placed on the internal data bus 42.

In this embodiment of applicant's invention, offline or non-real-time data entry systems 70 are also employed to provide automated sources for certain necessary data. Offline systems generate, for example, volatility data for calculation of theoretical values of options, or provide, for example, fundamental data including a company's earnings, shares outstanding and similar data. This data may be provided via magnetic tape or other magnetic storage medium, or over communications lines (external systems), or by data processing functions (internal systems). This data must also be edited and converted (block 75) for internal system use and is then placed on the internal data bus 42.

The central database is updated (block 65) with all data placed on the internal data bus 42. Whenever the central database is updated with transaction/free-wheeling data, the particular information is flagged as having just been updated. A transaction data update moves the previous current value into a temporary storage location so that the new current value can be compared, if necessary, with the previous current value. In order to support data processing schemes for cancellation, correction, or out-of-sequence transaction processing, past data record values are saved going back several update transactions. At some point, however, the historical data is discarded or may be transferred to offline storage to temporarily provide subscribers with historical transaction data, in a manner which would be obvious to those skilled in the art.

Figure 3:
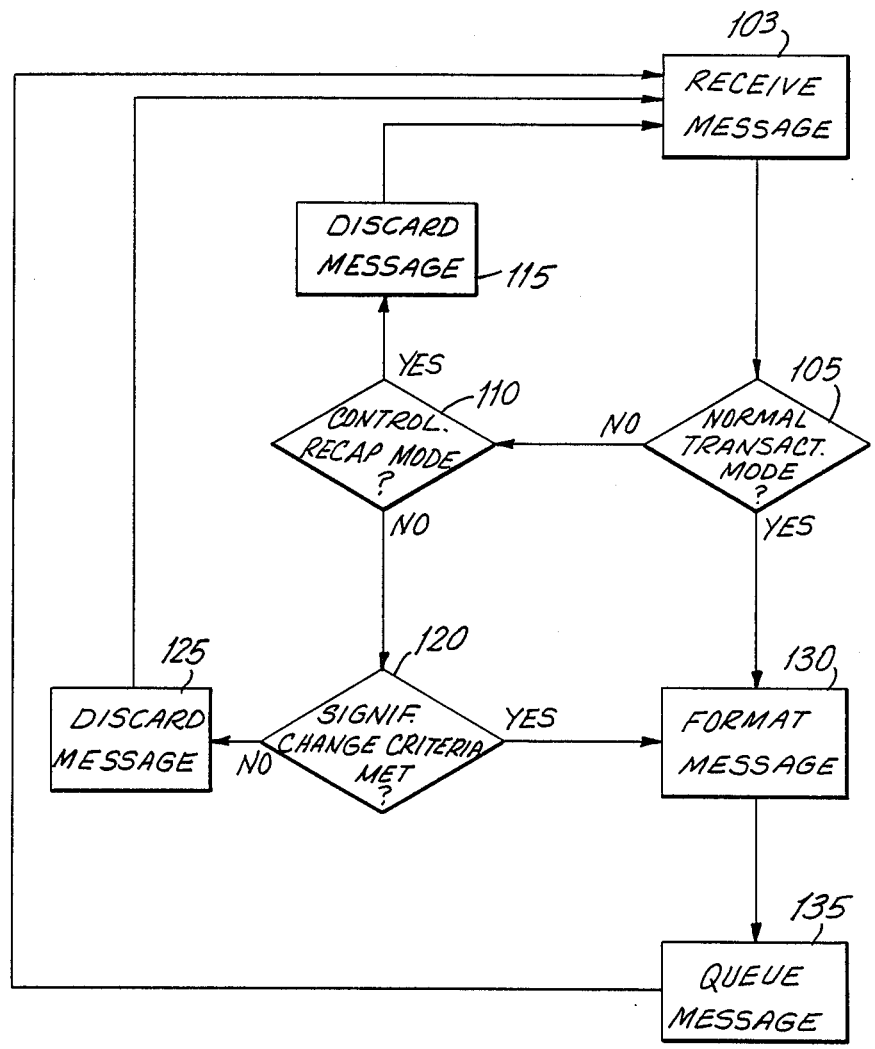
FIG. 3 is a schematic flow chart depicting detailed data processing for the dynamic message generation block 3 of FIG. 1.

Referring now to FIG. 3, individual elements of the dynamic message generation block 3 of FIG. 1 are shown. Transaction/free-wheeling data messages are received (block 103), having previously been placed on the internal data bus 42 of data collection block 1 of FIGS. 1 and 2. The system next determines whether to send a broadcast message containing the new information. First, the system operation mode is examined (block 105). If the system is operating in Normal Transaction Mode (YES output from 105), then an appropriate broadcast message is formated (block 130), and the message is placed in an output queue (block 135).

If the system is not operating in Normal Transaction Mode (NO output from 105), further processing of the update message depends on the then-current operating mode of the recap message generation functional block 4 of FIG. 1. It will later be described how the various modes of operation are determined. If the system is operating in Continuous Recap Mode (YES output from 110), the update message is discarded (block 115) by the dynamic message generation block. This does not affect the central database. In essence, when the system is not in Normal Transaction Mode, and is in Continuous Recap Mode (NO output from 105 and YES output from 110), the dynamic message generator is disabled. No dynamic messages are broadcast. This is a highly unusual event, resulting from only the heaviest data traffic volumes.

If the system is not operating in Normal Transaction Mode (NO output from 105), and is operating in Periodic Recap Mode (NO output from 110), then a further inquiry (block 120) is made in order to determine whether a dynamic broadcast message will be issued. The updated value is compared with the last previous value which was saved when the updated value was placed in the central database, as noted above. If predetermined Significant Change Criteria are met (YES output from 120), then the updated value is formatted for broadcast (block 130) and placed in the dynamic message output queue 135. If the Significant Change Criteria are not met (NO output from 120), then the updated value is discarded (block 125) by the dynamic message generator, again without affecting that value in the central database.

Figure 4:
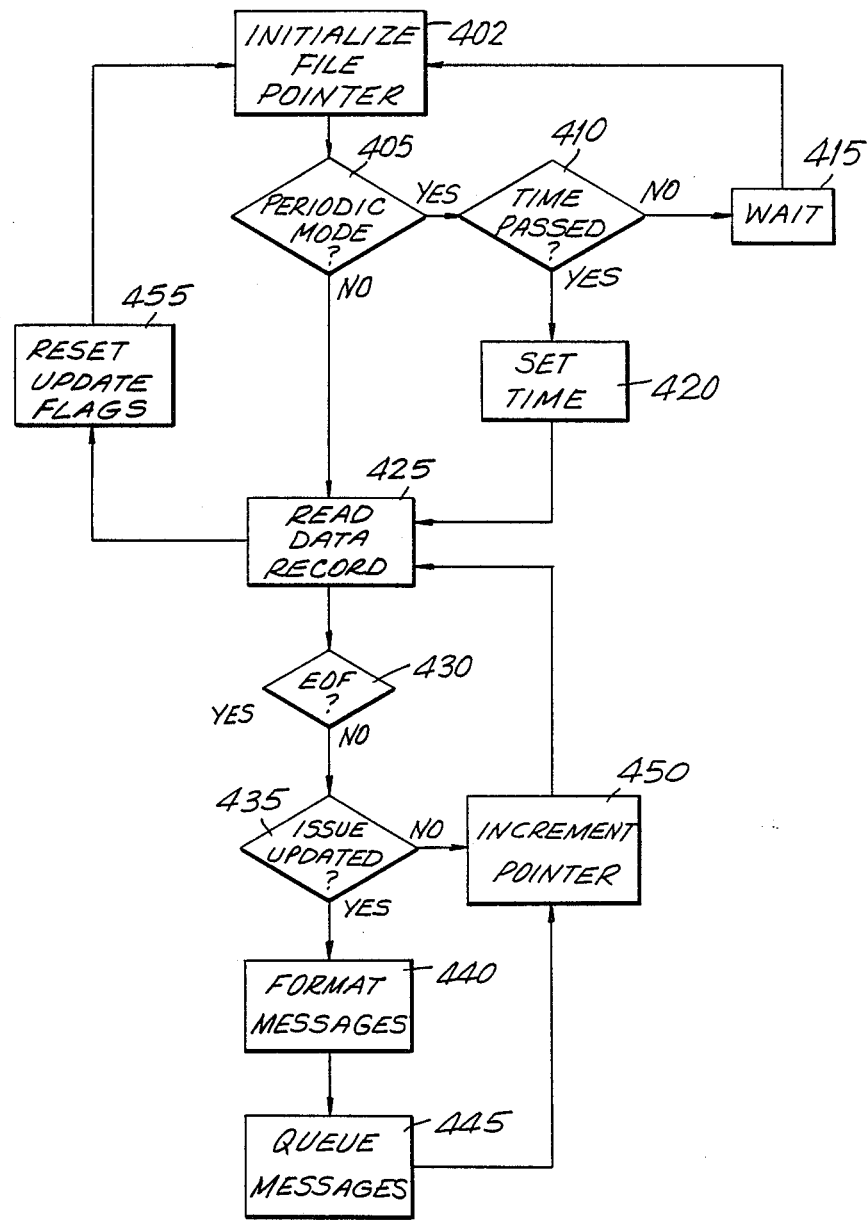
FIG. 4 is a schematic flow chart representing detailed data processing for the recap message generation block 4 of FIG. 1.

Referring now to FIG. 4, particular elements of the recap message generation functional block 4 of FIG. 1 are shown. The operation of this function ensures that subscribers can maintain the most accurate real-time data in their local databases, regardless of the volume of data traffic flow.

Starting first at periodic mode inquiry block 405, the system determines its current recap operating state. The recap operating stage (Periodic Mode or Continuous Mode), like the abovementioned overall system mode (Normal Transaction Mode or NOT Normal Transaction Mode), is determined by the queue processing block 7 of FIG. 1. As will be discussed in further detail below, the recap operating state also depends upon, among other criteria, the then-current data traffic volume.

If the recap function is in Periodic Mode (YES output from 405), the recap function determines if sufficient time has passed (block 410) since the last period recap message. In applicant's embodiment of a broadcast data distribution system, the interval between periodic recap messages is approximately 15 minutes. If less than the required delay has elapsed (NO output from 410), the system waits a predetermined period of time (block 415). After the predetermined waiting period is over, a file pointer, used to ensure that the entire database is scanned during the upcoming recap message generation, is initialized (block 402) to the top of the database file for transaction/free-wheeling data.

The recap function state is again checked (block 405) to determine whether any change in system status has occurred during the waiting period 415. Assuming that the system is still operating in Periodic Mode (YES output from 405), the elapsed time since a periodic recap message is again checked (block 410). If sufficient time has now passed (YES output from 410), the periodic recap timer is reset to zero (block 420), indicating that a periodic recap message is about to be generated.

Recap message generation proceeds by reading the first data record in the real-time central database 425. The location of the pointer in the file is examined (block 430) to make such that the End of File (EOF) marker has not been reached. If the pointer is not at the end of the film (NO output from 430), the data record is examined in order to determine whether that record has recently been updated, as indicated by the presence of a flag, as noted earlier. If the data record (in this illustrative embodiment a stock issue, for example) has been updated (YES output from 435), then a broadcast message for that data record is formatted (block 440) and placed in a recap message queue 445. The file pointer is then incremented (block 450) to the next data record and the indicated data record is read (block 425) as before. Had the data record not been recently updated (i.e., since the last recap message) (NO output from 435), the file pointer would simply be incremented (block 450) without any broadcast message being formatted.

In this way, the entire central database file for transaction data is stepped through, each updated data value causing an update message to be formatted for broadcast. This looping procedure continues until the End Of File marker is read (YES output from 430), indicating that all updated values have been reported. The update indicating flags in the central database files are then reset (block 455), the file pointer is initialized at the top of the data file (block 402), and the entire periodic recap message generation scheme begins again.

The normally encountered operation of the broadcast data distribution system can now be readily understood. Transaction data messages are formatted for broadcast as they are recieved, after having been edited and converted to more readily useful formats. Leaving for later the detailed description of the dequeuing and broadcasting functional blocks, these data messages are broadcast. Presumably, all entitled subscribers accurately receive these database update messages. It is known, however, that perfect transmission and subsequent perfect reception cannot be obtained. This is the precise reason that prior art systems use Ack/Nack and other two-way systems for critical data transmission. Aspects of the prevent invention substantially reduces the uncertainty of critical data transmission. Periodic recap messages covering each and every data update for a given previous time period are broadcast, thus providing currently accurate information for even those subscribers who did not accurately receive an earlier dynamic update message. This procedure eliminates the necessity of having the subscriber determine that certain messages were not received, and retransmitting those messages at great cost to the efficient operation of the system.

At this point it can also be readily understood that when data traffic volume is so severe that the dynamic message generation functional block 3 of FIG. 1 cannot keep up in a timely fashion, recap messages can be broadcast continuously, resulting in the only the slightest departure from real-time broadcasting of transaction data. This is seen where the system is no longer in Periodic Mode (NO output from 405), as determined by the queue processing functional block 7 of FIG. 1. The elapsed time requirement between recap messages is eliminated entirely and the system proceeds to scan and rescan the entire database for as long as the NO output of Periodic Mode inquiry (block 405) is maintained. Once the heavy data traffic volume subsides, as will be described below, Periodic Mode is again indicated (YES output from 405) and the system returns to its more usual state of operation.

Figure 5:
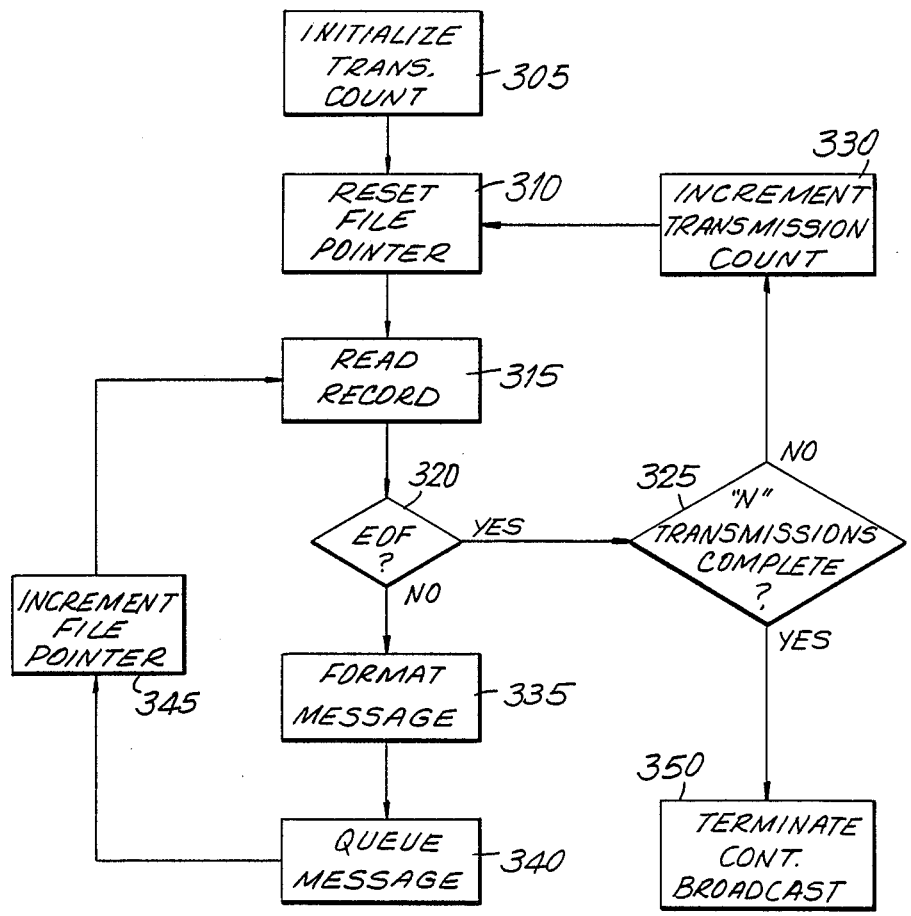
FIG. 5 is a schematic flow chart depicting data processing for the controlled message (static or non-real-time data) generation block 5 of FIG. 1.

Referring now to FIG. 5, there is shown data processing for generating controlled (non-real-time) messages (block 5 of FIG. 1). Controlled messages may be interleaved with dynamic messages on the same broadcast data stream, with a lesser priority being assigned to the controlled broadcast messages. In the present illustrative example of a broadcast data distribution system relating to the financial industry, categories of controlled message types include group control, batch control, full database record, after market adjustment (AMA), closing recap, and subscriber file messages.

These six controlled message types will be briefly described. Three Group Control (GC) messages are transmitted at the start and at the end of the transmission for each type of controlled broadcast for a given security class. Its purpose is to inform the receiver that a controlled broadcast is either about to begin or has just finished.

One Batch Control (BC) message is transmitted at the start and at the end of a batch of messages. Its purpose is to inform the receiver that an AMA batch of transactions is about to be transmitted or has just been completed.

The full database record message follows a BC message and is used to transmit a complete image of the central database. It is normally done at the end of the week, but it may be requested via a dialup connecton, under special arrangement, during the week.

After Market Adjustment (AMA) messages are distributed daily in the form of transactions grouped into batches. AMA transactions include: Basic Stock Add, Market Add, CUSIP/Symbol Change, Delete Stock, Market Delete, Option Add, Option Delete, Dividend, Current Earnings, Last Year Earnings, Estimated Earnings, Prior Interim Earnings, Shares Outstanding, Description Change, Option Group Delete, Primary Market Change, Volatility Update, Adjusted Composite Close, and New 52 Week High/Low messages. It will be readily apparent to those skilled in the art that a broad variety of types of information may be provided within the framework of AMA controlled messages.

The Closing Recap message is started at the end of the trading day in order to transmit closing prices and related data.

The subscriber file is a control file maintained for each subscriber. It is transmitted periodically throughout the day, and contains information such as a user-id, name, user entitlements and other statistics about the subscriber. It is used to ensure that subscribers are receiving the data that they have subscribed to receive. This and the preceeding types of controlled messages are understood to be merely illustrative of the different uses for controlled, as opposed to dynamic, messages.

Before explaining FIG. 5, the nature of a controlled broadcast should be further clarified. This type of broadcast message comprises a group of sequentially numbered batches of sequentially numbered message blocks, preceeded and succeeded by a number of GC messages. This is significant because, as will be made clear, controlled messages are generally transmitted repeatedly in succession.

Starting now at the top of FIG. 5, the transmission counter is initialized (block 305). A file pointer for the particular file from which messages are being prepared is reset (block 310) to the top of the file. A static data record is read (block 315). The system checks (block 320) to ensure that the End of File (EOF) marker has been reached. If the End Of File marker has not been reached (NO output from 320), a message block is formatted (block 335) and entered into the controlled message queue (block 340). The file pointer is then incremented to the next record (block 345) and that record is read (block 315), just as before.

If, instead, the End Of File marker is detected (YES output from 320), the system makes a further determination, i.e., whether "n" batches have been completed, where "n" is the number of times which the controlled broadcast message is to be repeated. This enhances the probability that all of the data will be received successfully. In applicant's specific embodiment, "n" is generally chosen to be three. If "n" batches have been completed (YES output from 325), then that particular controlled broadcast message is complete. If, however, less than "n" batches have been completed (NO output from 325), then the transmission counter is incremented (block 330), the file pointer is reset (block 310) to the top of the file, and at least one more batch of duplicate controlled message blocks is generated, each batch being preceeded and succeeded by a BC message. In this way, static (non-real-time) data can be effectively and accurately received by subscribers.

Figure 6:
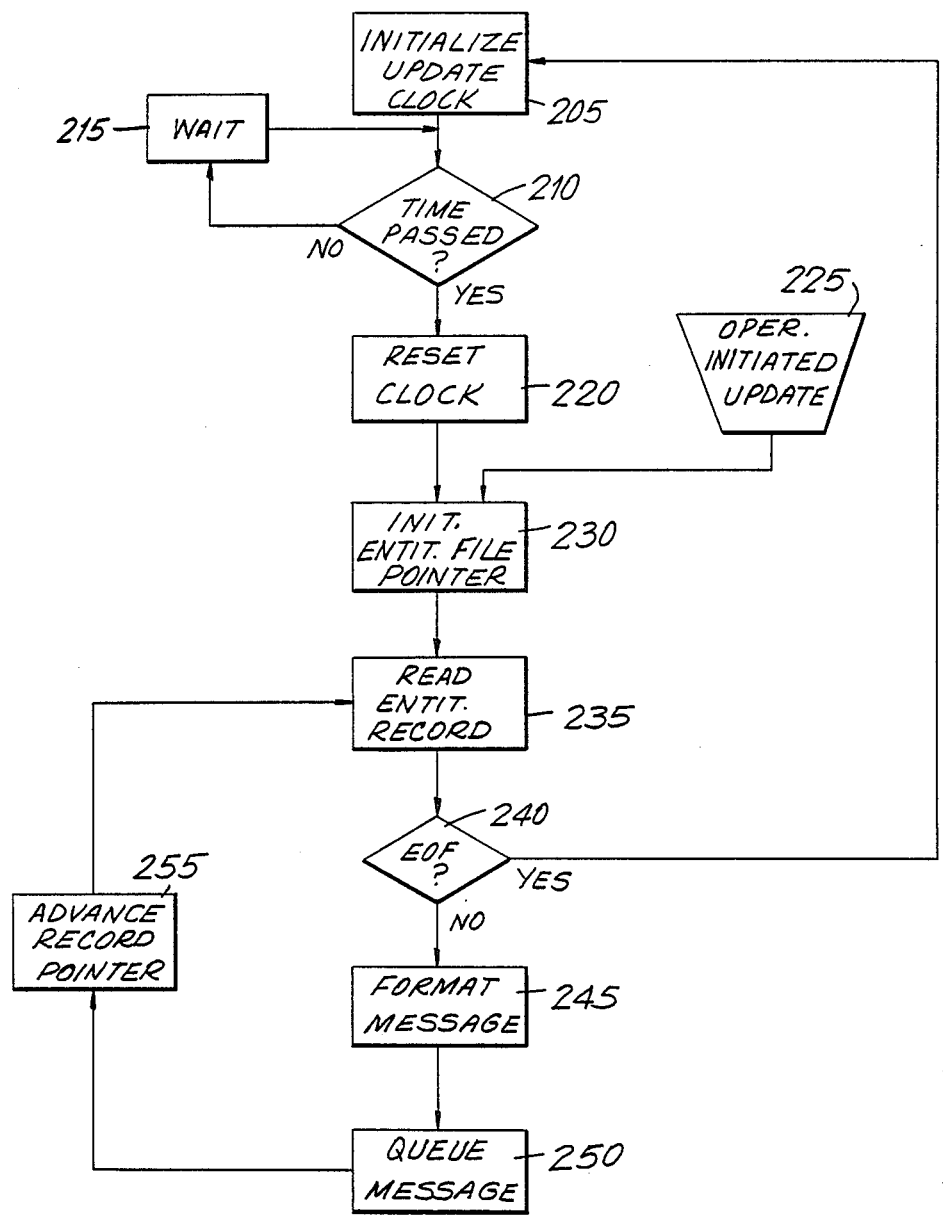
FIG. 6 is a schematic flow chart representing data processing for the entitlement message generation block 6 of FIG. 1.

Referring now to FIG. 6, there is shown detailed data processing for the entitlement message generation functional block 6 of the FIG. 1 overall block diagram. Entitlement messages are used to instruct subscribers' receivers as to which categories of broadcast messages they are entitled to receive. Every message transmitted is given an entitlement level. Essentially, the level of an incoming data message is compared with the then-current entitlement level for that subscriber as determined by previously received entitlement messages. This will be further described below.

There are at least two ways that an entitlement message can be issued: automatically and upon operator instruction. Both of these two options are shown in FIG. 6. Starting at the top of FIG. 6, the entitlement update clock is initialized (block 205). This clock is used in determining when periodic entitlement messages should be transmitted. A timer inquiry (block 210) determines whether sufficient time has elapsed since the last automatic entitlement broadcast. If not (NO output from 210), the system waits (block 215) a predetermined period of time, and then again makes the timer inquiry (block 210). This looping continues until sufficient time has elapsed (YES output from 210), indicating that an entitlement message should now be broadcast automatically.

The update clock it first reset (block 220) to ensure correct timing of the next succeeding automatic entitlement message. A file pointer is initialized (block 235) at the top of the entitlement data file in the central database. This ensures that the entire entitlement file will be broadcast. At this point, the secondway of issuing an entitlement broadcast will be readily apparent. Direct online operator input 225 can instruct the system to initialize the file pointer 230 and to continue as usual, in effect bypassing the entire timing portion of the entitlement data processing.

An entitlement data record is read (block 235) from the database file. After checking whether an End Of File marker is detected (block 240), an entitlement message is formatted for broadcast (block 245) (NO output from 240). Had the End Of File marker been detected (YES output from 240), the system would restart the message generation by reinitializing the update block 205. The entitlement message above is then placed in an entitlement message output queue 250. The entitlement file pointer is advanced (block 255) to the next data record in the entitlement data file, and the indicated record is read (block 235). In this fashion, the entire entitlement data file is stepped through, each record causing the formatting and queueing of an appropriate entitlement message for any particular subscriber or any group or even all subscribers.

It will be readily obvious to one skilled in the art that the entitlement messages can be structured to work in a variety of different ways. For example, a subscriber may be entitled to receive all broadcast data messages. A subscriber may be entitled to receive all but a certain subset of messages, or may be entitled to receive only a certain subset of messages. Another subscriber may be entitled to receive only messages intended directly and solely for that subscriber. These are several examples of the ways in which entitlement messages may be used in accordance with the principles of certain aspects of the present invention.

Figure 7:
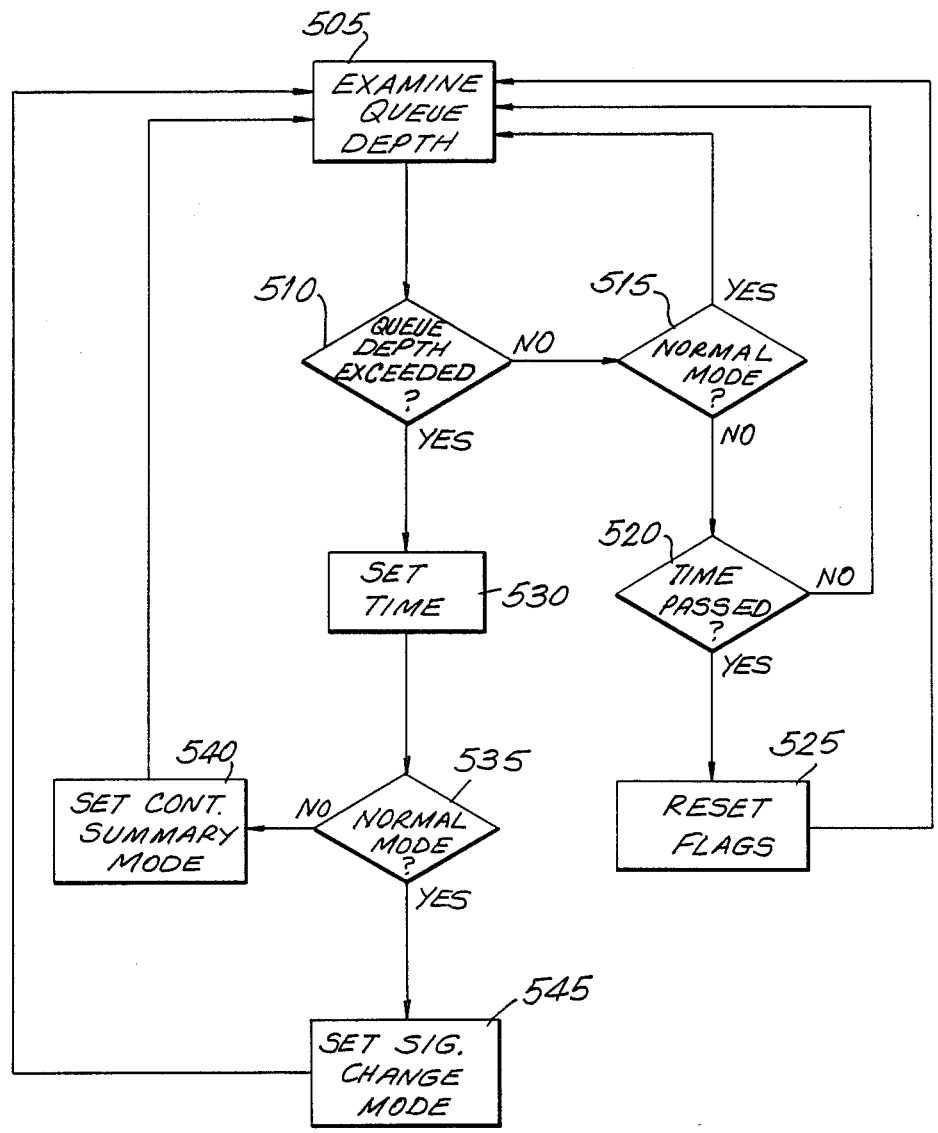
FIG. 7 is a schematic flow chart depicting data processing for the queue processing and management block 7 of FIG. 1.

Referring now to FIG. 7, details of the queue processing and management block 7 of FIG. 1 are shown. As noted above, this functional block controls the various modes of system operation, i.e., Normal Transaction Mode, Periodic Mode (recap), etc..

Looking now at the top of FIG. 7, the depths of various queues are first examined (block 505). All of the various queues are examined in a prioritized, heirarchical fashion since overflow in any queue will result in a certain amount of data loss (which may or may not be recoverable). Comparing the queue depths to predetermined norms and warning limits (block 510), the system determines whether any queue depth limits have been exceeded. If warning limits have been exceeded (YES output from 510), a queue depth alert is issued and a warning timer is set (block 530) indicating the start of the warning condition. The current system operating state is determined (block 535) in order to formulate the appropriate response to the initial queue depth alert. If the system is currently in Normal Transaction Mode (YES output from 535), the system is switched to NOT Normal Transaction Mode and Significant Change Mode 545, as a first level response. This has the effect, as shown in FIG. 3 and described in connection therewith, of limiting the number of dynamic messages generated. The throughput of the system is thus reduced, slowing buildup in the transaction message queue 135 of FIG. 3, without affecting the updating and maintainance of the central database. The response permits, in effect, the dequeuing function described below to "catch up".

The queue depths are then reexamined (block 505), and tested against the warning limits 510. If another warning is issued (YES output from 510), it is indicated that the system operation in Significant Change Mode was insufficient to adequately clear the queue congestion. The time of alert is set (block 530), and the system state is again checked (block 535). During this pass, however, the system will not be in Normal Transaction Mode (NO output from 535). This is the most severe queue condition encountered. Continuous Recap Mode is then set (block 540), disabling all further dymnamic message generation, as described in connection with the operation of block 110 of FIG. 3. Thus, regardless of the incoming data traffic volume, the dequeuing function will be able to clear the broadcast message queues. The queue depths are then monitored again (block 505).

This last described looping can continue for as long as the alerts continue to be issued (YES output from block 510). As some point in time, however, the warning limits will be found not to be exceeded (NO output from 510). This is the usual state of operation. Thus, when the system state is examined (block 515), if it is in Normal Transaction Mode (YES output from 505), the queue depths are monitored again (block 505). Essentially, no change in operation occurs. If block 515 is reached just after a queue depth alert situation, the system will be in either Continuous Summary Mode (a severe alert) or Significant Change Mode (a less severe condition), indicated by NO output from 515. In this case, the queue depth alert timer 530 is examined (block 520) to determine whether a predetermined period of time has passed since the last alert was issued. If not (NO output from 520), system operation is unaffected and the queue depths are remonitored (block 505). If sufficient time has passed, allowing the dequeuing function time to clear the queues to acceptable levels, system operation is reset (block 525) to Normal Transaction Mode and Periodic Recap Mode. The above described arrangement is thus seen to provide subscribers with reasonably timely data regardless of the data traffic volume.

Figure 8:
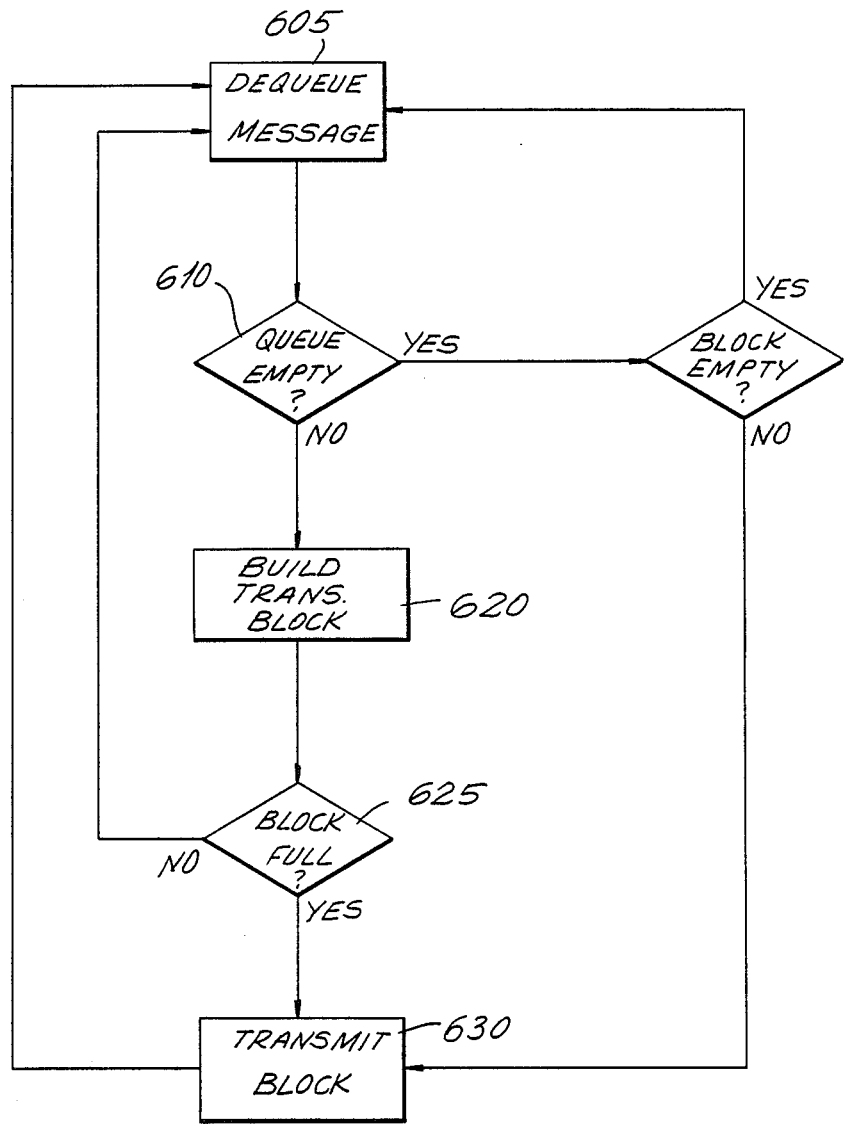
FIG. 8 is a schematic flow chart depicting the message broadcast block 8 of FIG. 1.

Referring now to FIG. 8, there is shown data processing for the data transmission functional block 8 of FIG. 1. Starting at the top of FIG. 8, formatted broadcast messages are removed from the several queues 135, 445, 340, 250 by priority dequeuer 605, each of the queues having a predetermined priority. Messages are dequeued from a particular queue until either the queue is empty or a predetermined time period has elapsed. If there are any messages waiting in the particular queue being processed (NO output from QUEUE EMPTY test 610), a transmission block is built (block 620) with the dequeued message. If more room remains in the transmission block (NO output from 625), another message is dequeued (block 605). As some point, the particular queue may become empty (YES output from 610). If the current transmission block is also empty (YES output from 615), processing control is returned to the priority dequeuer 605. If the transmission block has messages in it, however, the transmission block is sent to a transmission interface 630 and is broadcast.

Alternatively, the transmission block may fill up before a particularly queue is fully emptied (YES output from 625). In this instance, the full block is also sent to the transmission interface 630 and is broadcast.

Characterististics of the transmission interface and broadcast line, specific to this illustrative example of a broadcast data distribution system are as follows. The terms used as well known to one of ordinary skill in the art.

Character Code
BIT oriented, modified ACII subset
Operating Mode
Simplex (broadcast) SDLC framed
Transmission Mode
Synchronous
Line Speed
9600 baud
Interface
Standard EIA RS 232/C
Encoding Type
NRZI
Checking features
CRC- CCIT 16 and cyclic sequence number
Format
Blocked, variable length messages
Message format
Fixed length header followed by variable length body ending on a byte boundary
Maximum block length
Currently 518 bytes, including 6 bytes of SDLC frame Two publications showing these terms to be well known to persons of ordinary skill in the art are Black, U.D., Data Communications, Networks and Distributed Processing, Prentiss Hall Company, 1983, and Davies, D.W., D.L.A. Barper, W.L. Price, and C.M. Solomonides, Computer Networks and their Protocols, J. Wiley & Sons, 1979.

An illustrative SDLC transmission frame will now be described; however, it should be understood that this description merely amplifies the foregoing explanation of certain aspects of the present invention, and that many variations and modifications thereto will readily occur to those skilled in the art, including the use of other data transmission protocols. The SDLC transmission frame is organized in accordance with the IBM Synchronous Data Link Control Specification Publication Number GA27-3093-2, as follows:

!F!A!C!I!FCS!F!

Flag Field
The beginning and ending flag enclose the (8 bits) transmission. The flag is binary configured 01111110.
Address Field
The Address Field follows the beginning flag (8 bits) field immediately. The Address Field is used to address the transmission to a receiver or secondary station, and differs depending on the type of message (dynamic or controlled). An address of 11111111 is used for all real-time dynamic transmissions. The address for controlled messages may be either the real-time address 11111111 or a predetermined group address, used to differentiate transmissions for different levels of service. Individual station addresses are not used.
Control Field Immediately after the Address Field is the (8 bits) Control Field. It may be ignored by receivers. It contains an octal 23, which means an Unnumbered Information (UI) message with the Poll/Final (P/F) bit on.
Information
The information Field contains the data to Field be transferred. It always contains a block (variable; header followed by data messages. The multiple of Information Field is restricted to 512 bytes 8 bits) maximum, at present.
Frame Check The frame Check Sequence Corresponds to the Sequence Field abovementioned IBM publication. (16 bits)

Zero Insertion must be done by the transmitter to ensure that the flag pattern is never duplicated between the true beginning and ending flags. A binary zero is inserted after any succession of five contiguous ones within the frame. The receiver must look for this condition between the flags and remove the inserted zero. These zeros are not included in the FCS computation. Zero insertion conforms to the abovementioned IBM publication.

In idle state, 15 or more continuous 1 bits are transmitted (i.e., when frame are not being transmitted). In active state, one flag field will occur between successive frames of data.

The Information Field of the transmission block is composed of a block header followed by a variable number of messages. The current restriction to 512 bytes maximum, corresponding to 31 messages per transmission block, may be increased if necessary. The messages within a single transmission block are either dynamic or controlled, but not both. The transmission block header, of 16 bits, comprises five fields as follows:

Test Flag (1 bit) - All messages in one transmission block with be indicated as either live data or test data:
0=live
1=test Block Type (2 bits) - All messages in a transmitted block will be either dynamic or controlled:
0=dynamic
1=controlled
2=reserved for customer
3=undefined Message Count (5 bits) - The number of messages in the block. Used for format integrity check to verify the end of the block.

Deferral Flag (1 bit) - The deferral flag, if set, indicates that the system is not operating in Normal Transaction Mode:
0=Normal Transaction Mode
1=NOT Normal Transaction Mode Cyclic Sequence Number (7 bits) - Incremented block number
(0-127), recycled every 128 blocks, designed for gap detection. Separate series for dynamic and controlled messages may be interleaved.

Each data message has a fixed length message header followed by one message body. The message header provides sufficient information to isolate a message, determine the format, and interpret the message body.

The 29 bit dynamic message header provides the message length plus codes that identify a particular predetermined method for decompressing and interpreting the data elements in the message body. The four fields of the dynamic message header are as follows:

Message Length (9 bits) - This field specifies the actual number of data bits in the data message, except in the case of pass-through messages, such as Dow Jones News, for which the number of bytes is indicated. Message Type (5 bits) - The code for the functional message name, e.g., Trade, Quote, Price, etc.. Security Type (7 bits) - The code for the type of security, commodity or other type of record, such as Preferred Stock, Convertible Bond, Mutual Fund, etc., further subdivided by service entitlements, such as optionable vs. non-optionable, CTA-eligible vs. non-eligible, etc.

Global Market Center (8 bits) - The code that uniquely identifies a market worldwide. A block of codes are assigned to each geographic region that has basically similar trading hours, e.g., United States, Europe, etc.

Keeping in mind that the abovementioned formats are merely illustrative of a specific embodiment of applicant's inventive concepts and principles as applied to the financial industry, several additional techniques will now be briefly described which are used in formatting the dynamic message body. A variety of well-known data compression and formatting techniques are employed. It is readily apparent that the required level of data compression may depend at least to some degree on the transmission line speed, the incoming data collection rate and the amount of information to be distributed in each discrete data message. In this illustrative embodiment, typical real-time dynamic data messages have sizes of approximately 80 bits, and dynamic recap messages approximately 160 bits. Each distinct dynamic message body, is uniquely formatted in connection with the specific content of each particular message relevant to this illustrative embodiment. It will be apparent to those skilled in the art that similarly unique message body formats can be constructed for any particular application of a broadcast data distribution system.

Data elements within a message body may vary in length. A control element of fixed size precedes the length of the element and indicates the element length. The value in the element length field is one less than the actual length of the data element it controls. Elements may have dynamically reduced right-justification, indicated by an appropriate fixed size control element preceding the data element. Internal element omissibility is employed by use of a prior present flag element to indicate whether one or more sequential data elements are present or absent. In some cases, omission means no value; in others, it implies some constant value. Infrequently used data elements are located at the end of a message body format to permit dynamic truncation of all trailing data elements not applicable to a particular individual message. Most data elements are coded in an efficient binary form.

It is apparent to those skilled in the art that these techniques and others can be employed to reduce the size of broadcast messages to a minimum so that the time needed to transmit these messages is correspondingly minimized.

As an illustrative example of aspects of apllicant's inventive principles and concepts, the broadcast message format for a dynamic message will be fully set forth and explained. All possible data elements of the Trade message are shown, in sequence, along with permissible values, field sizes and required field characteristics. First, however, is a definitional key for understanding this representative message format.

VALUES - A range of specific values where numeric are stated as decimal (not octal) values. Parentheses surround further interpretations. Flag values, by convention, are:
1=yes, condition specified by element name is true;
0=no, condition specified by element name is false.
Sign values, by convention, are:
1=negative;
0=positive.
Tick values, by convention, are:
1=up or none;
0=down.

BITS - The element has a fixed length if one number is shown. Variable length elements are indicated by minimum and maximum lengths.

CODING - The different coding possibilities are:
A=ASCII, 8 bits, no parity;
B=binary;
C=a character code unique to this specific embodiment, 6 bits;
F=flags, 1 bit each;
T=time.

OMISSIBLE - Two types, internal and trailing:
I=Internal omissible element whose presence is determined by the prior "Present" flag bit:
  1=omissible fields present;
  0=omissible fields absent, however, their values may be implied.
T=Trailing omissible element whose absence is determined dynamically by the lack of applicability of this element and all subsequent elements in a message. blank =required field.

EXCEPTION FLAG - 0=Normal Message which should be used to update the database; 1 =Exception Message which is provided for completeness. This should not be used to update the database, and is not be supported by recaps. Condition codes indicate the reason for the exception condition, such as range check error or unsupported symbol.

Following is an illustrative dynamic message format:

| ELEMENT NAME | MESSAGE NAME: Trade VALUES | BITS | CODING | OMISSIBLE |
|---|---|---|---|---|
| HEADER | | | | |
| Message length (bits) | 1-511 | 9 | B | |
| Message type | 1 | 5 | B | |
| Security type | 1-124 | 7 | B | |
| Global market center | predetermined | 8 | B | |
| BODY | | | | |
| Exception present | 0 = normal | 1 | F | |
| | 1 = exception | | | |
| Symbol | | | | |
| Length (characters) | predetermined | 4 | B | |
| Symbol | predetermined | | predetermined | |
| Volume | | | | |
| Present flag | 1 (yes) | 1 | F | |
| | 0 (implied 100; omitted) | | next three elements | |
| Multiplier code | 1 (× 100) | 1 | B | I |
| | 0 (× 1) | | | |
| Length | | 5 | B | I |
| Volume | predetermined | | B | I |
| All prices and offsets | | | | |
| Fraction indicator | predetermined | 5 | B | |
| Price | | | | |
| Length | | 5 | B | |
| Tick | | 1 | B | |
| Composite tick | | 1 | B | |
| Update flags | predetermined | | | |
| High, composite high | | 1 | F | T |
| Low, composite low | | 1 | F | T |
| High (U.S. GMC) | | 1 | F | T |
| Low (U.S. GMC) | | 1 | F | T |
| Second trade in message | | | | |
| Present flag | If 0, next 13 elements omitted | 1 | F | T |
| Volume #2 | as above | | | I,T |
| Price #2 | | | | |
| Length | | 4 | B | I,T |
| Sign | | 1 | B | I,T |
| Offset | | | B | I,T |
| Tick #2 | as above | 1 | B | I,T |
| Composite tick #2 | as above | 1 | B | I,T |
| Update flags #2 | as above | 4 | F | I,T |
| Third trade in message | | | | |
| Present flag | If 0, next 5 elements omitted | 1 | F | T |
| Volume #3 | as above | | | I,T |
| Price #3 | as above | | | I,T |
| Tick #3 | as above | 1 | F | I,T |
| Composite tick #3 | as above | 1 | F | I,T |
| Update flags #3 (end of third trade) | as above | 4 | F | I,T |
| Reported time of trade | | | | |
| Present flag | If 0, next 3 elements omitted | 1 | F | T |
| Hours | 0-23 | 5 | B | I,T |
| Minutes | 0-59 | 6 | B | I,T |
| Seconds | 0-59 | 6 | B | I,T |
| Retransmission fill-in | predetermined | 1 | F | T |
| Update flags (continued for last trade of message only) | | | | |
| Not last/not composite last | | 1 | F | T |
| Last/not composite last | | 1 | F | T |

-continued

| ELEMENT NAME | MESSAGE NAME: Trade VALUES | BITS | CODING | OMISSIBLE |
|---|---|---|---|---|
| Number of conditions | | 3 | B | T |
| Condition codes | predetermined | 8 | B | I,T |
| No. of messages back | 0-999 | 10 | B | I,T |
| (present under certain predetermined conditions) | | | | |
| No. of seller days | 0-99 | 7 | B | I,T |
| (present under certain conditions) | | | | |
| Buyer ID/Seller ID | If 0, next 2 elements omitted | 1 | F | T |
| Buyer ID | 0-9, A-Z | 18 | C | I,T |
| Seller ID | 0-9, A-Z | 18 | C | I,T |

All values listed as predetermined are specified according to the individual security class, type, geographic market center, and other parameters.

As a further illustration of certain aspects of applicant's inventive principles and concepts, a comparison of an equity trade message received from the Securities Industry Automation Corp.'s Consolidated Tape System (CTS) with the dynamic broadcast message prepared therefrom by applicant's specific embodiment of a broadcast data distribution system is shown: Message received: trade of 500 shares of duPont at 40 ¾ on the New York Stock Exchange.

| CTS MESSAGE ELEMENTS | # BITS |
|---|---|
| Message Type | 8 |
| A (trade record, one trade, regular format) | |
| Message Network | 8 |
| A | |
| Retransmission Requester | 8 |
| 0 (not a retransmission) | |
| Message Sequence Number | 48 |
| 123456 | |
| Exchange ID | 8 |
| N (New York Stock Exchange) | |
| Stock Symbol | 24 |
| DD<blank> | |
| Volume | 32 |
| 0500 | |
| Whole Price | 24 |
| 040 | |
| Fractional Price | 8 |
| 6 (regular format: denominator = 8) | |
| TOTAL LENGTH | 168 bits |

Broadcast Dynamic Message: equity trade of 500 shares duPont at 40 ¾ on NYSE, opening trade, same as adjusted composite close, closed on an uptick yesterday on NYSE, but on a composite downtick.

| DYNAMIC MESSAGE ELEMENTS | # BITS |
|---|---|
| Message Length | 9 |
| 78 | |
| Message type | 5 |
| 01 (trade) | |
| Security Type | 7 |
| 01 (supported equity, CTA-Tape A eligible and optionable) | |
| Global Market Center | 8 |
| 016 (NYSE) | |
| Exception Present Flag | 1 |
| 0 (no) | |
| Symbol Length | 4 |
| 1 (2 characters - Type C coding) | |
| Symbol | 12 |
| DD | |
| Volume Present Flag | 1 |
| 1 (yes) | |
| Volume Multiplifer Code | 1 |
| 1 (× 100) | |
| Volume length | 5 |
| 2 (3 bits) | |
| Volume | 3 |
| 5 | |
| Fraction Indicator | 5 |
| 9 (4ths) | |
| Price Length | 5 |
| 7 (8 bits) | |
| Price | 8 |
| 163 (40 ¾) | |
| Tick | 1 |
| 1 (up) | |
| Composite Tick | 1 |
| 0 (down) | |
| Update Flags | 2 |
| High/Composite High Low/Composite Low | |
| Pad | 2 |
| TOTAL | 80 bits |

It will be readily apparent to those skilled in the art that this type of message preparation can be accomplished for any particular embodiment of a broadcast data distribution system, employing numerous modifications and alterations but without departing from the spirit or concepts or aspects of applicant's invention.

Turning now to controlled message broadcasts, the 32 bit controlled message header is comprised of the following four fields:

Message Length (9 bits) - The number of bytes in the message. Length=0 is used when a message is truncated to fit the maximum size of 504 bytes for an entire transmission block, and it continues into the next block.

Message Type (5 bits) - The code for the functional message name, e.g., GC, BC, AMA, etc.

Security Type (7 bits) - The code for the type of security, commodity or other type of record, further subdivided by service entitlements such as optionable vs. non-optionable. In addition, general grouping codes are used in the GC and BC messages to identify the group being controlled.

Global Market Center (8 bits) - The code that uniquely identifies market worldwide. A block of codes is assigned to each geographic region. In addition, general grouping codes are used in the GC and BC messages to identify the group being controlled.

Type of Record (3 bits) - The code that identifies if this is an Add (A), Delete (D), or Modify (M): 1B0 - Add (100) 1B1 - Modify (010) 1B2 - Delete (001)

Message Sequence Number (16 bits) - This indicates the record sequence number within the region.

The controlled message body format for two illustrative message types will now be explained in detail. Coding is either A (ASCII) or B (binary).

MESSAGE NAME

Group Control

| ELEMENT NAME | BITS | CODING |
|---|---|---|
| HEADER | | |
| Message Length | 9 | B |
| Message Type (26) | 5 | B |
| Security Class | 6 | B |
| Geographic Region | 8 | B |
| Group (0)/Batch (1) | 2 | B |
| Start (0)/End (1) of Group/Batch | 2 | B |
| subtotal = | 32 | |
| BODY | | |
| Normal (0)/Retransmitted (1) | 8 | A |
| AMA (0)/ADM (1) Group | 8 | A |
| Group Number | 8 | B |
| Effective Date MMDDYY | 48 | A |
| No. of Batches in this Group (256 max.) | 8 | B |
| subtotal = | 80 | |
| TOTAL = | 112 | |

MESSAGE NAME

Basic Stock Add (AMA)

| ELEMENT NAME | BYTES | CODING |
|---|---|---|
| Expanded Message Header | 4 | |
| CUSIP Number | 10 | |
| Ticker Symbol | 16 | |
| Transaction Code | 2 | |
| Security Type | 1 | B |
| Primary Market | 1 | B |
| Status Code | 1 | |
| Issuer Description | 25 | |
| Issue Description | 30 | |
| TOTAL = | 90 | |

(Note that the Basic Stock Add transaction may include other add transactions such as Market Add. These secondary transactions immediately follow the Basic Stock Add.)

Figure 9:
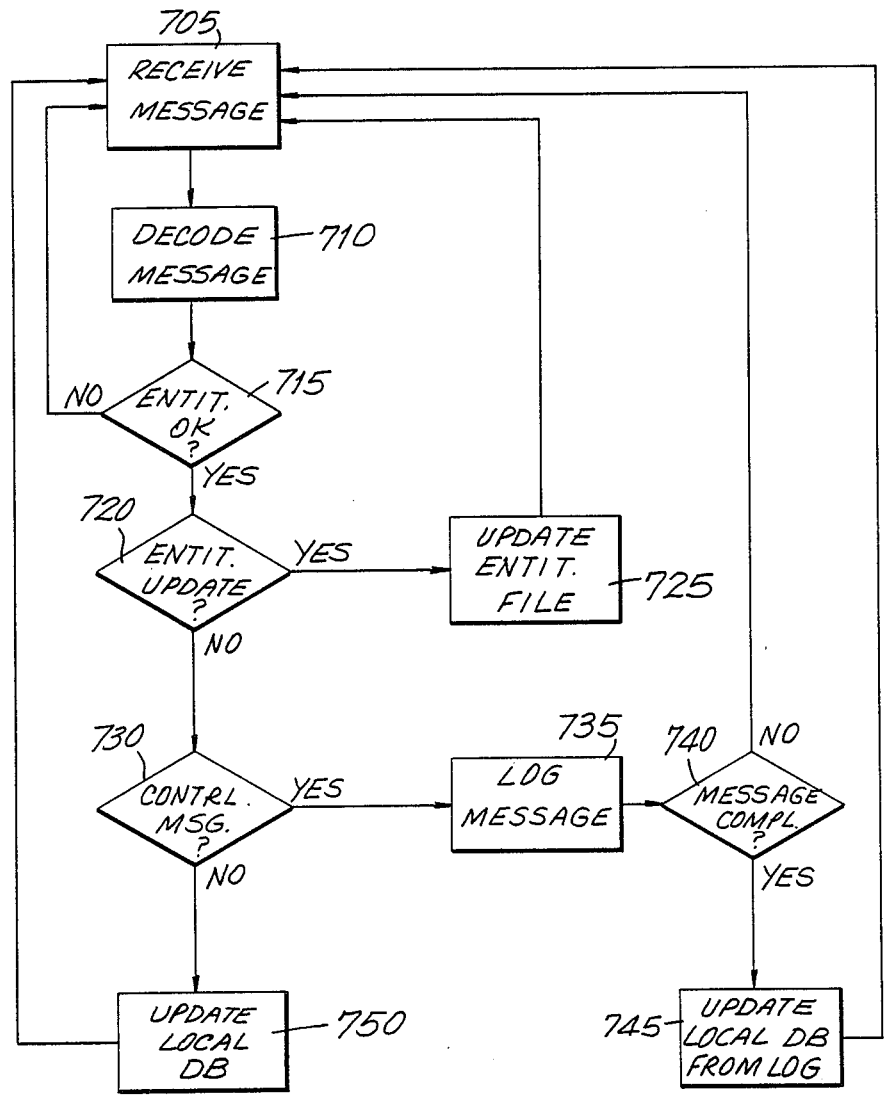
FIG. 9 is a schematic flow chart depicting detailed data processing for the data receiving block 9 of FIG. 1.

Referring now to FIG. 9, there is shown data processing for the data receiving functional block 9 of the FIG. 1 overall block diagram. Each subscriber is provided with receiving apparatus for accomplishing at least the functional elements described beow.

Broadcast messages are received (block 705) from one of a number of different broadcast media used by applicant's specific illustrative embodiment of a broadcast data distribution system, including satellite, microwave, leased line, voice grade telephone line, and others. The message is preliminarily decoded (block 710) into what may or may not be a subscriber specific format. The entitlement label of the message is then checked (block 715). If the subscriber is not entitled to receive the data message (NO output from 715), the message is discarded and another message is received (block 705).

If the subscriber is entitled to the data message (YES output from 715), the type of message is determined (blocks 720, 730). If the message is an entitlement update message (YES output from 720), then the subscriber's entitlement file is updated (block 725), and the next message is received (block 705). If the message is a dynamic message (NO output from 720 and NO output from 730), then the local database is updated (block 750) with the update information, and then the next broadcast message is received (block 705). If the message is a controlled broadcast message (NO output from 720 and YES output from 730), the sequentially numbered messages are logged as having been received (block 735). Keeping in mind that controlled broadcast messages are typically repeated to ensure accuracy of reception by all entitled subscribers, the receiver determines whether the controlled broadcast has been repeated the proper number of times (block 740). If not (NO output from 740), the next message is received (block 705), that message being a repeat of the controlled broadcast. As the repeat broadcast is logged (block 735), portions which were not accurately received the first time are filled in. At some point, typically after three repeats in this illustrative example, the controlled broadcast is complete (YES output from 740). The local database is then updated with the individual data messages temporarily stored in the log (block 745). The next broadcast message is then received (block 705).

The above described composite arrangement has thus been shown to provide an improved broadcast data distribution system which provides distributed real-time and static data on the same broadcast line at the lowest possible cost of delivery, while ensuring accuracy of maintained local databases without the necessity of two-way communication between subscribers and the central database site.

The above described arrangement is merely illustrative of the principles of the present invention. Numerous modifications and adaptations thereof will be readily apparent to those of ordinary skill in the art without departing from the spirit and scope of the present invention.

What is claimed is:

1. A broadcast data distribution system for acquiring, editing, formatting and distributing real-time and non-real-time data collected from a plurality of data sources being received in a number of different formats comprising:

data collection means for receiving, and editing the data, and for reformatting said data for further processing in the broadcast data distribution system;

central database means for receiving and storing said data in a plurality of data files, said central database means including means for updating data already stored in the central database means from data received from said data collection means;

message generation means for preparing data messages from the data stored in the central database means for further processing, said message generation means further comprising:

dynamic message generation means for preparing real-time data messages from current data values stored in the central database means;

recap message generation means for preparing periodic summaries of real-time data messages from current data stored in the central database means;

controlled message generation means for preparing controlled data messages from non-real-time data stored in the central database means; and entitlement message generation means for preparing entitlement messages from entitlement data stored in the central database means, said entitlement messages being used to control subscriber access to broadcast messages;

message queue processing management means responsive at least to the message generation means for controlling operation of said message generation means;

message broadcast means responsive at least to said message generation means for preparing broadcast messages for broadcast transmission from data messages prepared by said message generation means; and data receiving means for receiving said broadcast messages from the message broadcast means, said data receiving means including means for preparing local data messages from the broadcast messages, local database means for receiving and storing data in a plurality of data files, and means for updating data already stored in the local database means for data messages contained in broadcast messages received by said receiving means, whereby said real-time and non-real-time data are broadcast without substantially continuous repetition of said broadcast messages.

2. A broadcast data distribution system as set forth in claim 1, wherein the data collection means further comprises:

reasonability checking means for checking the reasonability of at least real-time data collected by the broadcast data distribution system; and reformatting means for reformatting data collected in each of said different formats into a smaller set of more efficiently formatted data for further processing.

3. A broadcast data distribution system as set forth in claim 1, wherein the central database means further comprises:

real-time data file means for storing current values of real-time data:

historical data file means for storing past values of real-time data; and update flag means for indicating an updating of real-time data stored in the real-time data file means by the broadcast data distribution system.

4. A broadcast data distribution system as set forthin claim 3, the central database means further comprising:

static data file means for storing non-real-time data collected by the broadcast data distribution system; and entitlement level file means for storing entitlement data, said entitlement data including identification of subscribers entitled to receive broadcast messages from the broadcast data distribution system and service level indicating means for controlling the level of service provided to each of said subscribers.

5. A broadcast data distribution system as set forth in claim 1, wherein the dynamic message generation means further comprises:

dynamic message generation control means responsive to said message queue processing management means for controlling the dynamic message generation means to (a) prepare real-time data messages for all real-time data updated by the central database updating means, (b) prepare real-time data messages for some but not all real-time data updated by said central database updating means, or (c) prepare no real-time data messages.

6. A broadcast data distribution system as set forth in claim 5, wherein the recap message generation means further comprises:

update data detection means for scanning the real-time data stored in the central database means in order to detect real-time data which is updated from that which was in the central database means at the immediately preceding scan of said detection means; and recap message generation management means responsive to said message queue processing management means for controlling the generation of recap messages either in groups at predetermined intervals of time or continuously.

7. A broadcast data distribution system as set forth in claim 6, wherein the controlled message generation means further comprises:

controlled message generation controlling means for preparing a predetermined number of identical controlled messages for each controlled message generated.

8. A broadcast data distribution system as set forth in claim 7, wherein the entitlement message generation means further comprises:

entitlement message generation controlling means for preparing entitlement messages both periodically and upon the instruction of a system operator.

9. A broadcast data distribution system as set forth in claim 1, wherein the message queue processing management means further comprises:

message queue examination means for determining the depths of a plurality of message queues associated with each of said varous message generation means;

queue depth alert means for determining when any of the message queue depths exceeds a predetermined value; and system mode management means responsive to said queue depth alert means and the current system mode for controlling the dynamic message generation means to (a) prepare real-time data messages for all real-time data updated by the central database updating means, (b) prepare real-time data messages for some but not all real-time data updated by said central database updating means, or (c) to prepare no real-time data messages.

10. A broadcast data distribution system as set forth in claim 9, wherein the system mode management means further comprises means for controlling the generation of recap meassages either in groups at predetermined intervals of time or continuously.

11. A broadcast data distribution system as set froth in claim 10, wherein the message queue processing management means further comprises:

a queue depth alert timer for recording the time at which the queue depth alert means detects that a predetermined queue depth limit has been exceeded, said system mode management means being further responsive to said queue depth alert timer for controlling the broadcast data distribution system to maintain the real-time status of each subscriber's local database under increased data traffic volumes.

12. A broadcast data distribution system as set forth in claim 1, wherein the message broadcast means further comprises:

message dequeuing means for removing data messages from the various message queues; and transmission block generation means for preparing broadcast messages, each said broadcast message comprising at least one data message and having a predetermined format for broadcast transmission over a broadcast medium.

13. A broadcast data distribution system as set forth in claim 1, wherein the data receiving means further comprises:

entitlement checking means for determining whether said data receiving means is entitled to receive and further process a particular received broadcast message.

14. A broadcast data distribution system as set forth in claim 13, wherein the local data base updating means further comprises:

message type determination means for distinguishing entitlement update messages from dynamic and controlled data messages;

local entitlement file means for storing a subscriber's service level;

local entitlement file updating means for updating the local entitlement file whenever an entitlement update message is received;

controlled message logging means for storing the first transmission of a group of controlled messages;

controlled message comparison means for comparing subsequent identical groups of controlled messages to the group of controlled messages logged, and for correcting errors detected in the logged group of controlled messages; and controlled broadcast message completion detecting means for detecting the end of a controlled message so that the local database means can be updated with the controlled data messages.

15. A method of broadcasing real-time and non-real-time data in the same data stream to subscribers comprising the steps:

collecting data from a plurality of data sources, the data from each source having a potentially unique format;

editing and converting the received data into a smaller set of message formats;

selectively checking the value of the data for reasonableness;

storing the data in a central database if the data is a type not already stored in said central database;

updating the data stored in the central database with new incremental value pertaining to such data;

flagging each new or updated data value as being an updated data value;

removing previous values of updated data from the central database to temporary storage locations for further reference;

preparing real-time data messages for broadcast during periods of normal data traffic volume received;

preparing real-time data messages for broadcast only for updated data values which differ from the then current data by incremental values of a predetermined amount during periods of heavier data traffic volume received;

preparing no real-time messages for broadcast during stil heavier data traffic volume received;

periodically preparing update message summaries for broadcast by scanning the central database for data values which have been updated since the last central database scan during both normal and heavier data traffic volumes received;

continuously preparing update message summaries for broadcast by continuously scanning the central database for updated data values during periods of still heavier data traffic volume received;

preparing a predetermined number of identical groups of non-real-time messages for broadcast to ensure accurate reception of these messages;

preparing entitlement messages for broadcast both periodically and upon request of an operator, said entitlement messages being used to enable and disable particular subscribers' receiving apparatus;

preparing broadcast messages from the previously prepared data messages; and transmitting the broadcast messages to an unlimited number of subscribers over a broadcast medium, each subscriber then decoding the broadcast message and updating its local database with the individual data messages contained in the broadcast message received, if entitled to receive the data message.

* * * * *